3,265,544
LITHIUM PERCHLORATE EXPLOSIVE
David Pelton Moore, Marlow, N.H.
(9210 Flower Ave., Silver Spring, Md.)
No Drawing. Filed June 17, 1964, Ser. No. 375,954
1 Claim. (Cl. 149—19)

My present invention relates to improvements in explosives and more particularly to what is termed solid explosive composition, and as set forth in my Patent No. 3,135,634, granted June 2, 1964, except that in the present instance, I use a lithium perchlorate.

The method of compounding is the same as set forth in the above noted patent, except more detail as to the drying of the particle sized explosive when used as a substitute for dynamite, and for TNT.

Lithium perchlorate is employed for the dynamite substitutes, and lithium perchlorate varies from 65% for 20% dynamite, 75% for 30% dynamite, and 90% for 40% dynamite, using the same binder and fuel, and waterproofing agent as in said patent above noted.

Lithium perchlorate is employed as a substitute for TNT, and also as a solid propellant, and in each instance carries 85% of the perchlorate, to 15% of the rubber. In each instance perchlorate, 3% of sulfur, relative to the solid rubber content is added, so that when the putty like mass after mixing is molded to shape, it can be heat, pressure and time vulcanized similarly to the vulcanizing of rubber automobile tires.

Several rubber types may be employed, one being that set forth in my Patent No. 2,341,055, covering a rubber compound, which is an aqueous dispersion of vulcanized rubber employing sodium bisulphite as the coagulator for the natural rubber latex and sodium perborate as the retarder of coagulation; also ground gum rubber dissolved in acetone, benzine or naphtha, or combination of these, this binder, being used in making my solid propellant, with lithium perchlorate.

One formulation for this dynamite substitute is:

Lithium chlorate—65%, 75% and 90%
Rubber—5% to 25%

One example in making the substitute for TNT, and solid propellant, is:

Lithium perchlorate—75% to 90%
Sulfur 3% as to solid rubber
Rubber—10 to 25%

In making a solid propellant, the TNT substitute being mixed similarly to the dynamite substitute, a dough mixer is used, wherein the perchlorate in pulverized form is mixed with the rubber and sulphur to a dough like mass and then placed in the first mold, to shape the disk desired. Slight pressure is used to make the mass solid, then it is removed from the mold, wiped dry of the sweat, due to syneritis, weighed, and then placed in a super pressure steam heated oven with infra red lamps, and at intervals removed and weighed, until when latex is used, the water content is nil and then placed in a vulcanizing mold, where heat, pressure and time vulcanization is resorted to, similarly to that of vulcanizing automobile tires.

When volatile solvents with gum rubber and sulfur are used, the perchlorate and the flowable vulcanizable or curable rubber is mixed, as above, but the dough like mass is placed directly in a vulcanizing mold, and when sufficient of the solvent has been removed, the molded mass is subjected to heat, pressure and time vulcanization, as above set forth to produce the desired solid propellent.

What I claim as new is:

An explosive comprising a mixture of lithium perchlorate, 75 to 90% by weight, and as a rubber binder 10 to 25% by weight of an aqueous dispersion of vulcanizable rubber having as a coagulator sodium bisulphite, and as a retarder sodium perborate to make a non-tacky, non-hygroscopic and waterproof explosive.

References Cited by the Examiner

UNITED STATES PATENTS

| | | | |
|---|---|---|---|
| 2,969,638 | 1/1961 | Sammons | 149—19 X |
| 2,991,166 | 7/1961 | Ferguson | 149—19 |
| 2,997,376 | 8/1961 | Bartley | 149—19 |
| 3,003,861 | 10/1961 | Reynolds et al. | 149—19 |
| 3,014,796 | 12/1961 | Long et al. | 149—19 |
| 3,054,702 | 9/1962 | Stengel et al. | 149—19 |
| 3,055,781 | 9/1962 | Yamamoto | 149—19 |
| 3,070,470 | 12/1962 | Argabright et al. | 149—19 |
| 3,104,995 | 9/1963 | Reynolds et al. | 149—19 |
| 3,109,761 | 11/1963 | Cobb et al. | 149—19 |
| 3,148,229 | 9/1964 | Bordenkircher | 149—19 X |

OTHER REFERENCES

Kit et al.: "Rocket Propellant Handbook," The MacMillan Company, New York, 1960, pp. 31 and 201.

LEON D. ROSDOL, *Primary Examiner.*

BENJAMIN R. PADGETT, *Examiner.*